United States Patent [19]

Kim

[11] Patent Number: 5,958,031

[45] Date of Patent: Sep. 28, 1999

[54] DATA TRANSMITTING/RECEIVING DEVICE OF A MULTIPROCESSOR SYSTEM AND METHOD THEREFOR

[75] Inventor: Myeong-Soo Kim, Seoul, Rep. of Korea

[73] Assignee: SamSung Electronics Co., Ltd., Kyungki-do, Rep. of Korea

[21] Appl. No.: 08/882,603

[22] Filed: Jun. 25, 1997

[30] Foreign Application Priority Data

Jun. 25, 1996 [KR] Rep. of Korea ....................... 96-23579

[51] Int. Cl.[6] ....................................................... G06F 13/00
[52] U.S. Cl. ........................... 710/126; 710/128; 710/107; 710/40
[58] Field of Search ..................................... 395/306, 308, 395/287, 860; 710/126, 128, 107, 40

[56] References Cited

U.S. PATENT DOCUMENTS

| 3,323,109 | 5/1967 | Hecht et al. ............................... 711/151 |
| 4,468,733 | 8/1984 | Oka et al. ................................. 395/306 |
| 4,536,839 | 8/1985 | Shah et al. ............................... 711/151 |
| 4,604,743 | 8/1986 | Alexandru ................................. 370/85 |
| 4,764,865 | 8/1988 | Temple, III .............................. 711/150 |
| 4,933,838 | 6/1990 | Elrod ......................................... 371/9.1 |
| 5,006,961 | 4/1991 | Monico ..................................... 361/413 |
| 5,355,455 | 10/1994 | Hilgendorf et al. ..................... 395/306 |
| 5,388,230 | 2/1995 | Yamada et al. .......................... 395/308 |
| 5,426,740 | 6/1995 | Bennett ..................................... 395/306 |
| 5,584,010 | 12/1996 | Kawai et al. ............................ 711/117 |
| 5,608,884 | 3/1997 | Potter ....................................... 395/304 |
| 5,616,575 | 4/1997 | Sakakibara et al. ............... 395/800.34 |

*Primary Examiner*—Ayaz R. Sheikh
*Assistant Examiner*—Ario Etienne
*Attorney, Agent, or Firm*—Robert E. Bushnell, Esq.

[57] ABSTRACT

A data transmitting/receiving device and method for transmitting and receiving data between processors in a multiprocessor system. A data bus interconnecting a plurality of processors is separated into sub-buses, with each sub-bus associated with a separate processor. This architecture serves to increase bus occupation efficiency and thereby improve system performance, and it allows DPRAMs to be replaced with SRAMs to reduce the production cost of the system.

17 Claims, 4 Drawing Sheets

DATA TRANSMITTING/RECEIVING DEVICE OF A MULTIPROCESSOR SYSTEM AND METHOD THEREFOR

CLAIM OF PRIORITY

This application makes reference to, incorporates the same herein, and claims all benefits accruing under 35 U.S.C. §119 from an application for DATA TRANSMITTING/RECEIVING DEVICE OF A MULTI-PROCESSOR AND METHOD THEREFOR earlier filed in the Korean Industrial Property Office on the 25th day of Jun. 1996 and there duly assigned Ser. No. 23579/1996, a copy of which application is annexed hereto.

BACKGROUND OF THE INVENTION

1. Field of the Invention

The present invention relates to a data transmitting/receiving device and method of a multiprocessor system and, more particularly, to a device and method for transmitting and receiving data between processors in a multiprocessor system for improving the system performance.

2. Description of the Related Art

Generally, a multiprocessor system consists of a plurality of processors that transmit and receive data between one another. An example of such a multiprocessor system is the fiber loop carrier (FLC), which commonly is employed as an optical transmission device.

In the prior art, the processors of a multiprocessor system communicate with the CPU and with the various peripheral devices in accordance with a shared-bus or bus occupying method or through a dual port RAM. In a bus occupying method, coordination between several processors using a common data bus is accomplished by placing on standby all of the processors except one processor currently occupying the bus. The occupying processor reads data from or writes data to the SRAM. Upon release of the bus by the occupying processor, another processor can access the SRAM and read data stored there by the first processor, thereby realizing communication between the processors. This approach requires no special hardware components, but it fails to realize the computational potential of parallel processing because any processor's memory operation delays the memory operations of all the other processors.

Dual port RAM (DPRAM) architectures have offered an alternative to bus occupation by allowing simultaneous access by two adjacent processors to a memory unit interposed between them If each processor connects to one or more other processors through interposed DPRAMs, then data can be rapidly transferred from one processor to the next by means of the DPRAMs. Indeed, this interconnection method is usefully employed for high speed data communication in various contexts. When the subject system includes many processors, though, this solution becomes expensive because it requires a large number of DPRAMs, thereby increasing the manufacturing cost of the multiprocessor system.

SUMMARY OF THE INVENTION

Accordingly, it is an object of the present invention to provide a device and method for transmitting and receiving data between processors in a multiprocessor system with improved system performance.

It is another object of the present invention to provide a device and method for transmitting and receiving data between processors suitable for use in an economical multiprocessor system.

The present invention therefore provides in a first aspect a data communication device in a multiprocessor system, the device comprising a data bus including a plurality of sub-buses and a plurality of memory devices. Each one of the sub-buses has a proximal end connected to the proximal end of every other one of the sub-buses and a distal end connected to one of a plurality of processors in the multiprocessor system. Each one of the memory devices is connected to one of the sub-buses between the proximal end and the distal end of the sub-bus as a local memory device for the processor connected to the sub-bus. Each one of the sub-buses provides data communication between the memory device connected to the sub-bus and the processor connected to the sub-bus and between the memory device connected to the sub-bus and every other one of the sub-buses.

In a second aspect, the present invention provides a data communication method in a multiprocessor system having a plurality of processors and a data bus interconnecting the processors, with the data bus including a plurality of sub-buses and with each one of the sub-buses connecting a memory device to one of the processors at a distal end of the sub-bus and to every other one of the sub-buses at a proximal end of the sub-bus. The method comprises a first step of assigning an access priority to each one of the processors at each one of a predetermined sequence of access cycles. It includes a second step of storing, at one of the predetermined sequence of access cycles, requested data over a first one of the sub-buses to the memory device connected to the first sub-bus in response to a data request from the processor connected to the distal end of the first sub-bus and in accordance with the access priority assigned to the processor for the access cycle.

BRIEF DESCRIPTION OF THE DRAWING FIGURES

A more complete appreciation of this invention, and many of the attendant advantages thereof, will be readily apparent as the same becomes better understood by reference to the following detailed description when considered in conjunction with the accompanying drawing figures, in which like reference symbols indicate the same or similar components, wherein.

DETAILED DESCRIPTION OF THE PREFERRED EMBODIMENT

Figure 1:
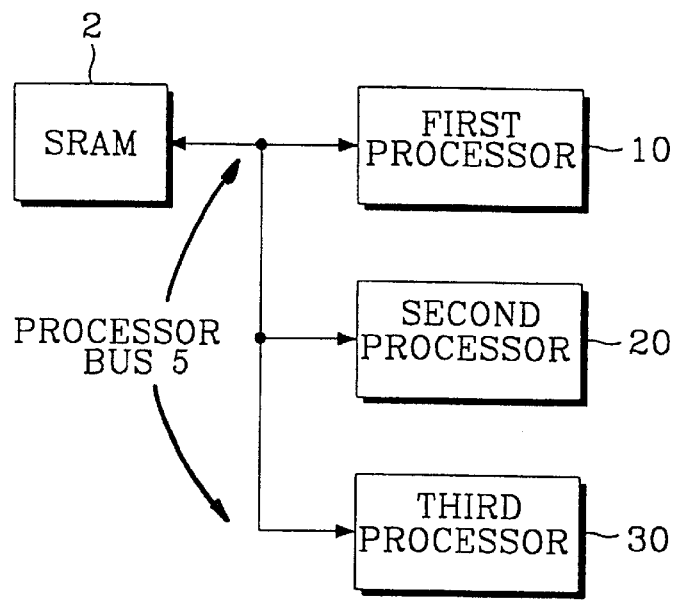
FIG. 1 is a block diagram of an existing multiprocessor system illustrating the interconnection between processors according to a shared bus method.

FIG. 1 shows a generic shared-bus multiprocessor system. In the illustrated system, a single data bus 5 is shared by processors 10, 20, and 30 for transmission and reception of data therethrough. Data bus 5 provides a communication channel between each of processors 10, 20, and 30 and an SRAM 35. In accordance with a communications protocol for a system architecture of this type, when one of the processors occupies the bus 5 the remaining processors are kept on standby. Upon completion of its memory operation by the former, one of the latter occupies the bus 5 and reads data from the contents of SRAM 35. This procedure realizes communication between the processors in such a system, but it does so at the price of a substantial loss of computational efficiency.

Figure 2:
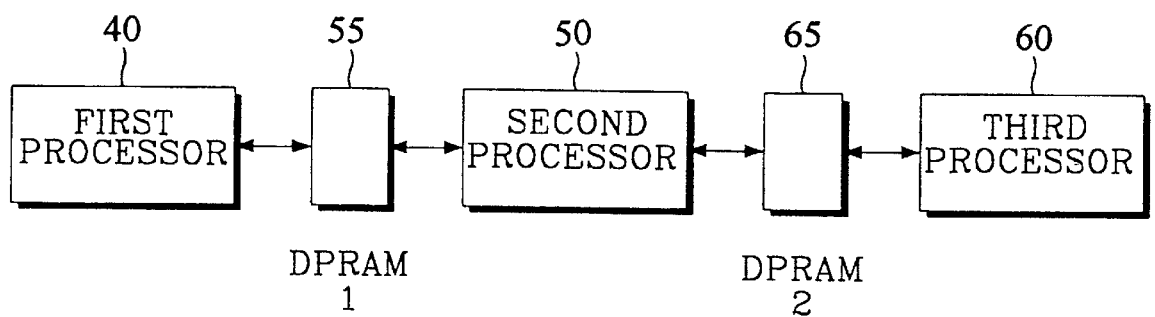
FIG. 2 is a block diagram of an existing multiprocessor system illustrating the interconnection between processors through dual port RAMs.

FIG. 2 illustrates a type of existing system in which a first processor 40 and a second processor 50 are connected to each other through a first DPRAM 55, and second processor 50 and a third processor 60 are connected to each other through a second DPRAM 65. Communication in such a system takes place in the following manner: when one processor seeks to transfer data to another processor, the former writes the data into the corresponding DPRAM and informs the latter thereof. The latter then reads out the data stored in the DPRAM, whereby communication between processors is realized.

Figure 3:
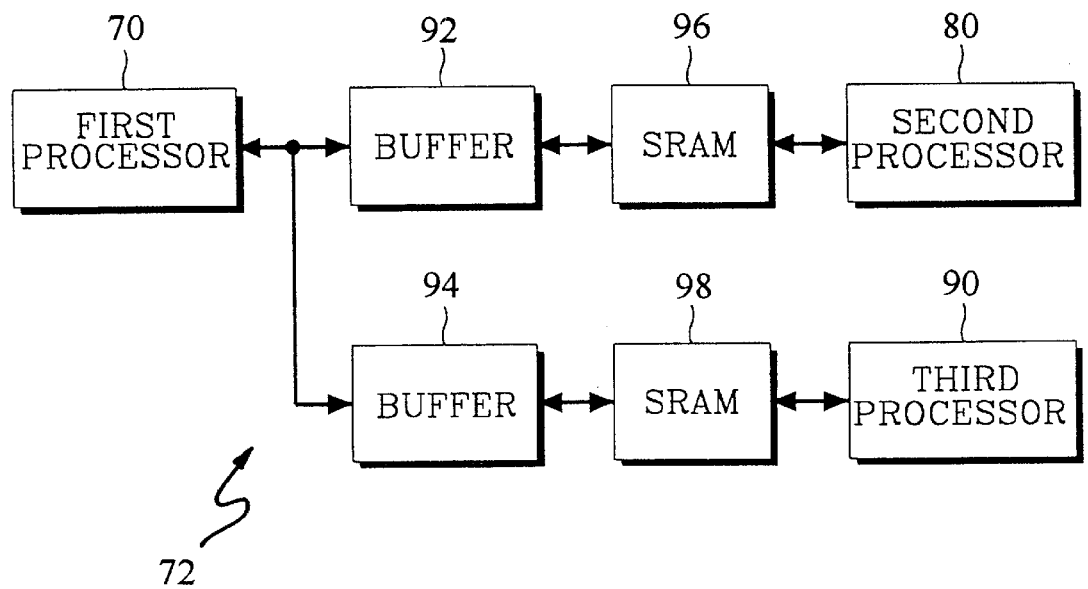
FIG. 3 is a block diagram of an exemplary interconnection between the processors in a multiprocessor system including a communication architecture according to the present invention.
Figure 4:
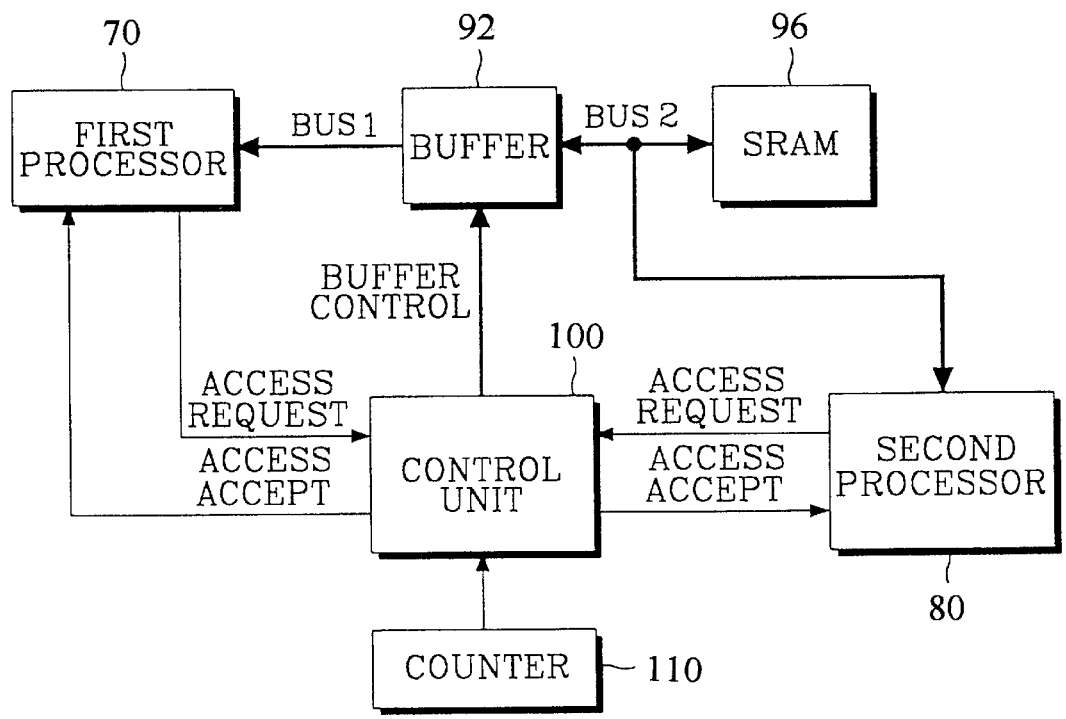
FIG. 4 is a partial view of the multiprocessor system of FIG. 3 showing in detail the data transmitting and receiving device of the present invention and further illustrating the concomitant interconnection between the processors.

FIGS. 3 and 4 show an exemplary multiprocessor system according to the present invention at two different levels of detail. FIG. 3 illustrates the basic processing elements and data communication paths of the system, which in this example comprises first processor 70, second processor 80, and third processor 90. A data communication device 72 according to the present invention includes: buffers 92 and 94 for separating a data bus of the system into sub-buses: a first sub-bus connecting buffer 92, SRAM 96, and processor 80; and a second sub-bus connecting buffer 94, SRAM 98, and processor 90. Each sub-bus provides both a communication path between the SRAM and the processor on the sub-bus and a communication path between the SRAM and other elements of the multiprocessor system (e.g., processors on other sub-buses of the data bus).

Each buffer is interposed on the data bus between two of the processors, thus defining a proximal end of its associated sub-bus that connects the sub-bus to the rest of the data bus. Each SRAM is accessible by other processors through the sub-bus buffer, as well as by its local processor. The SRAMs thus provide transient storage for data in communication between the processors. It should be noted that, while FIG. 3 does not show every feature of the present invention, it conveniently presents an example of the overall topology of a multiprocessor system incorporating data communication device 72.

FIG. 4 shows in greater detail a portion of the multiprocessor system illustrated in FIG. 3. As indicated by FIG. 4, data communication device 72 further includes at least a control unit 100 for controlling access priority with respect to SRAMs 96 and 98. In device 72, SRAMs 96 and 98 are standard memory devices that provide local storage to processors 80 and 90, respectively. In a preferred embodiment, SRAMs 96 and 98 also perform the function of storing data being communicated between the two processors 80 and 90. Control unit 100 continuously monitors a control signal channel, provided by an auxiliary bus separate from the data bus, to detect the presence of an access request signal from one or more of the processors and to control access priority by assigning access in alternation.

Control unit 100 thus provides an access control function that facilitates efficient bus sharing between all processors subject to its control. Each of buffers 92 and 94 is maintained in a default state of high impedance unless enabled by a buffer control signal generated by control unit 100. This buffer control signal is sent by control unit 100 when a processor on a different sub-bus is granted access to the SRAM associated with the buffer's sub-bus. Buffers 92 and 94 thus isolate the sub-buses in normal (i.e., local) operation, whereby the processor on each sub-bus can perform its operational cycle independently of the other processors. In particular, each processor freely accesses its local SRAM in this normal operation state, without signalling access requests to control unit 100.

To initiate access of an SRAM on another sub-bus (a "foreign SRAM"), a processor transmits an access request signal to control unit 100. The access priority assigned by control unit 100 to that processor's request depends upon the order of that request relative to other requests: control unit 100 assigns the same level of priority to all of the processors so that no single processor remains in idle state for a long time. Moreover, control unit 100 reassigns specific priorities at specified intervals, which efficiently controls allocation of bus occupation.

Figure 5:
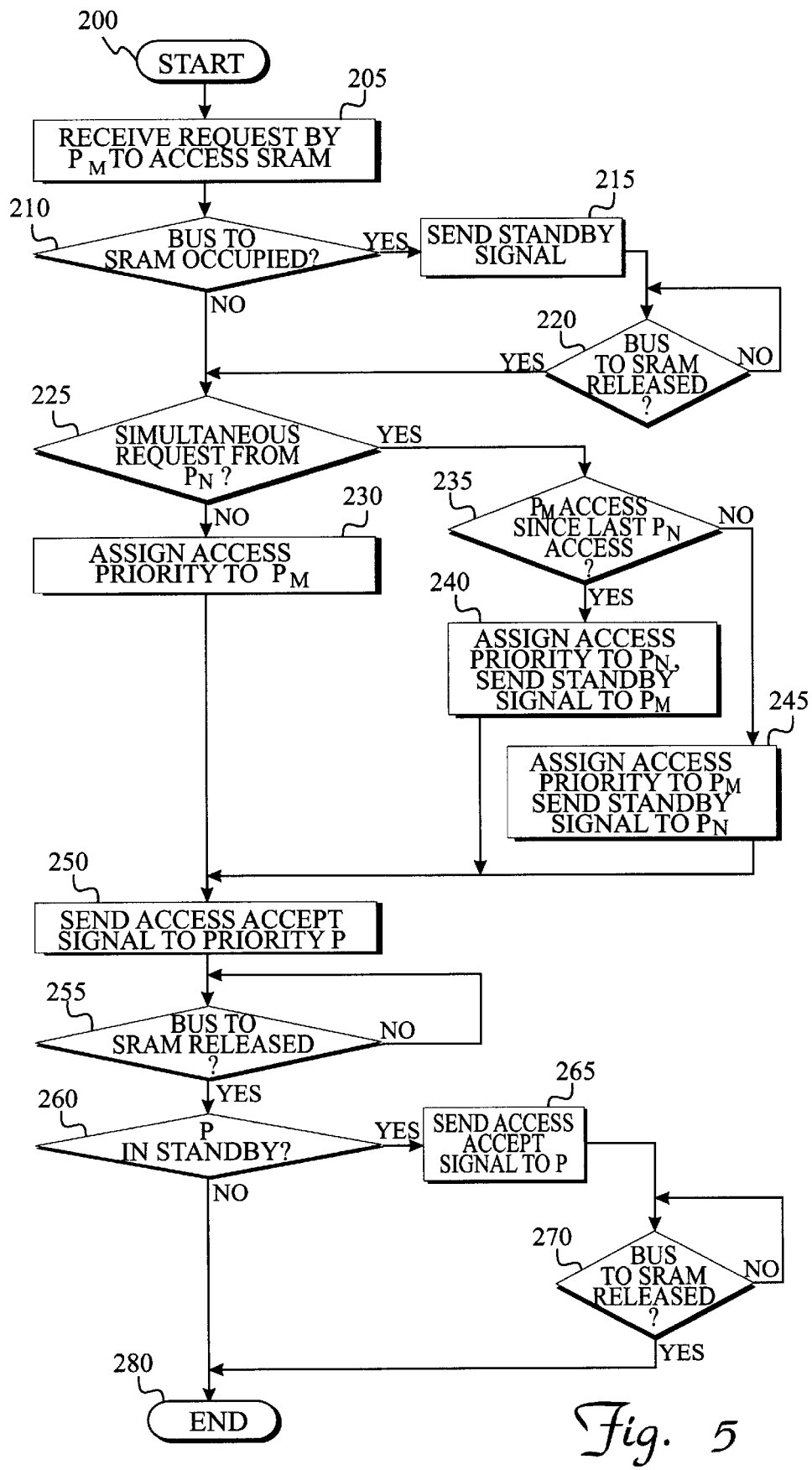
FIG. 5 is an operational flow diagram illustrating the operation of the access priority method of the present invention.

This access priority method operates in the following manner, as illustrated in the flow diagram of FIG. 5. First, to request access to a foreign SRAM, a processor $P_M$ sends an access request signal to control unit 100, and the prioritization procedure begins at step 200. Control unit 100 receives the access request signal at step 205 and, at step 210, determines whether the SRAM is currently being accessed (i.e., its sub-bus is occupied). If another processor currently has access to the SRAM, then at step 215 control unit 100 transmits a standby signal to processor $P_M$ that places $P_M$ into a standby mode until the SRAM is released. At step 220, when the SRAM is released, control unit 100 allows processor $P_M$ to access the SRAM, thereby enabling communications between the foreign SRAM's processor and $P_M$. Of course, the processor local to the SRAM also is placed into a standby mode until $P_M$ has completed its access of the SRAM.

Step 225 allows control unit 100 to address the case when two processors simultaneously request occupation of the bus. If no processor $P_N$ has simultaneously requested access to the same SRAM, then at step 230 processor $P_M$ receives access priority. But if $P_N$ has also requested access, then at step 235 control unit 100 determines the bus occupation priority based on the value counted by a counter 110. Depending upon the priority determined by the value of counter 110, at step 240 access priority is assigned either to $P_N$ and a standby signal sent to $P_M$, or at step 245 access priority is assigned either to $P_M$ and a standby signal sent to $P_N$. At step 250 control unit 100 send an access accept signal to the processor that has access priority with respect to the particular SRAM. Steps 255 through 270 simply illustrate one approach by which control unit 100 might carry out the clean-up operation of granting access to the processor that previously was placed on standby.

Figure 6:
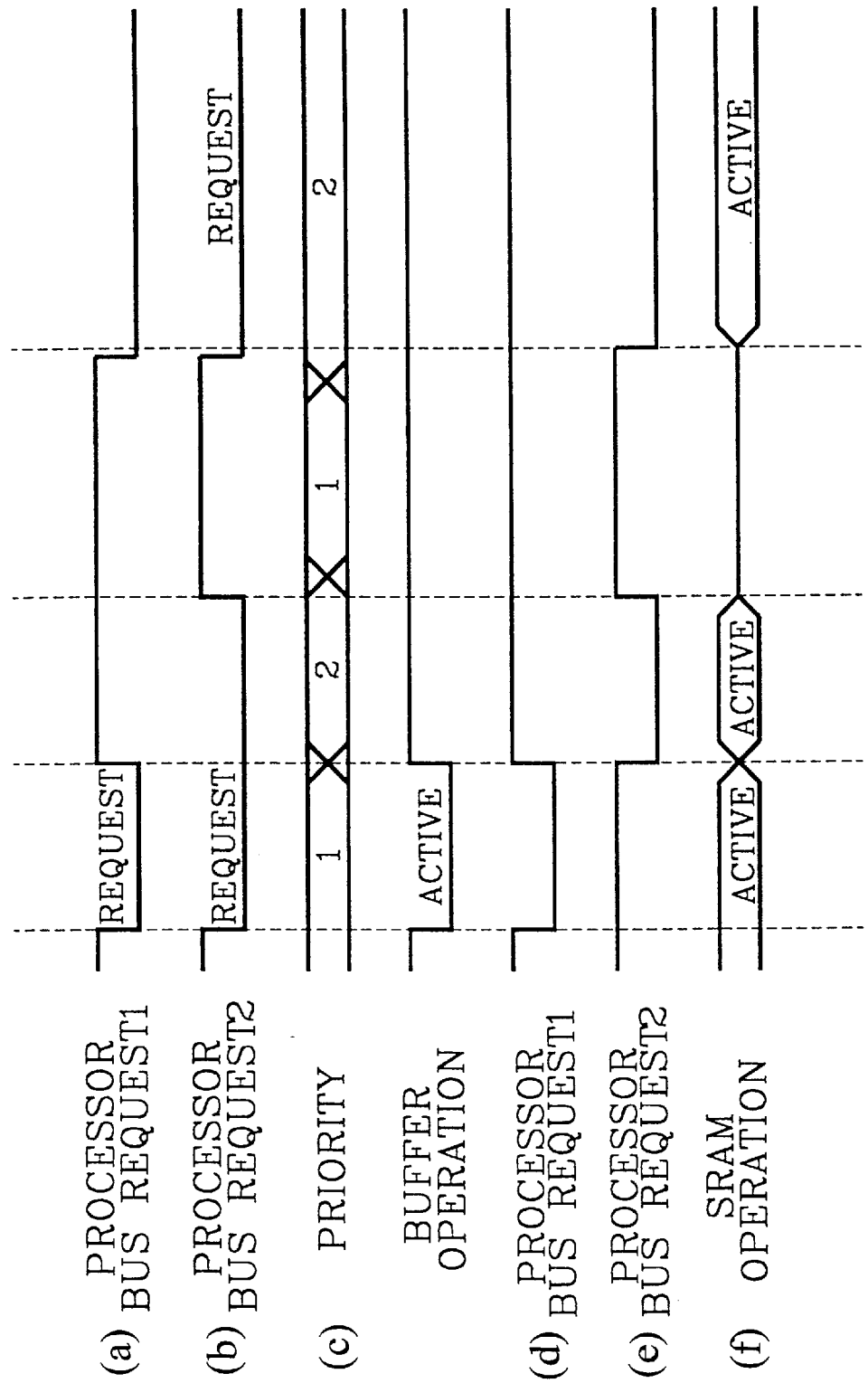
FIG. 6 is a timing chart illustrating SRAM access prioritization in the data transmitting and receiving device according to the present invention.

FIG. 6 provides a timing diagram to illustrate further the access prioritization and assignment procedure. Diagrams (a) and (b) show simultaneous requests by processors 1 and 2, respectively, for access to the same SRAM. Diagram (c) shows a preferred embodiment for assignment of priority in which control unit 100, by reference to counter 110, alternates priority between processors 1 and 2 in successive access cycles. By this assignment pattern, processor 1 has priority in the first access cycle, when processors 1 and 2 simultaneously request access to the SRAM. Thus, processor 1 is permitted to occupy the sub-bus during the first access cycle, as indicated by diagram (d). Processor 2 has access priority in the second access cycle and, as shown by diagram (e), occupies the sub-bus after the bus is released from occupation by processor 1. In the third access cycle processor 1 again has access priority, but neither processor has requested access; thus, as shown in diagram (f), the SRAM is not active in the third access cycle (note that this timing diagram does not consider accesses to the SRAM by its local processor). Processor 2 again requests access in the fourth access cycle and, because it has access priority according to the alternating priority method illustrated by diagram (c), it is permitted to occupy the sub-bus without waiting in standby.

As mentioned above, the present invention provides the advantage of improved system performance through increase bus occupation efficiency. It achieves this goal by dividing the data bus into separate sub-buses, one for each processor, which allows a substantial degree of concurrent processing while reducing production costs for the multiprocessor system by replacing DPRAMs with SRAMs. Moreover, the use of buffers 92 and 94 (FIG. 3) allow processors 80 and 90 to use their respective sub-buses for local communication with their associated local SRAMs, thereby eliminating the need for a separate local data bus. The present system also provides an advantage over some prior art devices in that here each sub-bus connects to other sub-buses only at its proximal end and thus does not require a bus switch or other hardware that may be associated with a plurality of connection points.

As compared with the existing bus sharing method illustrated in FIG. 1, the present invention offers a considerable degree of improvement in system performance, and the degree of improvement increases as more processors are included in the multiprocessor system. For example, assuming that the number of processors is N and the bus access time required for one processor is represented by T, with the bus topology of FIG. 1, the N processors need a total time of N×T for each processor to occupy the bus once. The present invention, in contrast, by providing each processor its own sub-bus, enables all of the processors to execute a memory access within a time interval of about T. In practice, a small amount of time for control operations is added to the time T. However, this additional time does not greatly affect the overall system performance, even with a large number of processors.

What I claim is:

1. A data communication device in a multiprocessor system, comprising:
    a data bus including a plurality of sub-buses, with each one of said plurality of sub-buses having a proximal end connected to a proximal end of every other one of said plurality of sub-buses and a distal end connected to one of a plurality of processors in said multiprocessor system; and
    a plurality of memory devices, with each one of said plurality of memory devices being connected to one of said plurality of sub-buses between said proximal end and said distal end as a local memory device for said processor connected to said sub-bus;
    wherein each one of said plurality of sub-buses provides data communication between said memory device connected to said sub-bus and said processor connected to said sub-bus, and between said memory device connected to said sub-bus and every other one of said plurality of sub-buses;
    said device further comprising a plurality of buffers, and wherein each one of said plurality of buffers is interposed at said proximal end of one of said plurality of sub-buses between said sub-bus and every other one of said plurality of sub-buses.

2. The data communication device of claim 1, wherein each one of said plurality of processors communicates data to any other one of said plurality of processors by storing said data in said one of said plurality of memory devices connected to said one of said plurality of sub-buses having said distal end thereof connected to said other one of said plurality of processors.

3. A data communication device in a multiprocessor system, comprising:
    a data bus including a plurality of sub-buses, with each one of said plurality of sub-buses having a proximal end connected to a proximal end of every other one of said plurality of sub-buses and a distal end connected to one of a plurality of processors in said multiprocessor system; and
    a plurality of memory devices, with each one of said plurality of memory devices being connected to one of said plurality of sub-buses between said proximal end and said distal end as a local memory device for said processor connected to said sub-bus;
    wherein each one of said plurality of sub-buses provides data communication between said memory device connected to said sub-bus and said processor connected to said sub-bus, and between said memory device connected to said sub-bus and every other one of said plurality of sub-buses;
    said device further comprising a control unit in control communication with each one of said plurality of processors, wherein said control unit is adapted to:
        assign an access priority to each one of said plurality of processors at each one of a predetermined sequence of access cycles; and
        accept, at each one of said predetermined sequence of access cycles, a request for access to one of said plurality of memory devices from a first one of said plurality of processors when said access priority of said first one of said plurality of processors is higher than said access priority of any other one of said plurality of processors requesting access at said access cycle.

4. The data communication device of claim 3, wherein said control unit is further adapted to perform data transfer between a transmitting one and a receiving one of said plurality of processors by retrieving data over said data bus from said local memory device for said transmitting processor and by storing said data over said data bus to said local memory device for said receiving processor when said control unit has accepted, from said receiving processor, a request for access to said local memory device for said transmitting processor.

5. The data communication device of claim 4, further comprising a plurality of buffers, and wherein each one of said plurality of buffers is interposed at said proximal end of one of said plurality of sub-buses between said sub-bus and every other one of said plurality of sub-buses.

6. The data communication device of claim 3, wherein each one of said plurality if memory devices is an SRAM.

7. A data communication device in a multiprocessor system, comprising:
    a data bus including a plurality of sub-buses, with each one of said plurality of sub-buses having a proximal end connected to a proximal end of every other one of said plurality of sub-buses and a distal end connected to one of a plurality of processors in said multiprocessor system; and a plurality of memory devices, with each one of said plurality of memory devices being connected to one of said plurality of sub-buses between said proximal end and said distal end as a local memory device for said processor connected to said sub-bus;

wherein each one of said plurality of sub-buses provides data communication between said memory device connected to said sub-bus and said processor connected to said sub-bus, and between said memory device connected to said sub-bus and every other one of said plurality of sub-buses; and said device further comprising a plurality of buffers, and wherein each one of said plurality of buffers is interposed at said proximal end of one of said plurality of sub-buses between said sub-bus and every other one of said plurality of sub-buses;

wherein each one of said plurality of memory devices is an SRAM.

8. A data communication method, comprising the steps of:

assigning, in a multiprocessor system having said plurality of processors and a data bus interconnecting said plurality of processors, with said data bus including a plurality of sub-buses and with each one of said plurality of sub-buses connecting a memory device to said plurality of processors at a distal end of said sub-bus and to every other one of said plurality of sub-buses at a proximal end of sub-bus, an access priority to each one of said plurality of processors at each one of a predetermined sequence of access cycles; and storing, at one of said predetermined sequence of access cycles, requested data over a first one of said plurality of sub-buses to said memory device connected to said first sub-bus in response to a data request from said processor connected at said distal end of said first sub-bus and in accordance with said access priority assigned to said processor for said access cycle.

9. The data communication method of claim 8, further comprising the step of accepting a data request from a requesting one of said plurality of processors when said access priority assigned to said requesting processor at said access cycle is higher than said access priority of any other one of said plurality of processors requesting access at said access cycle.

10. The data communication method of claim 8, further comprising the step of placing said processor connected at said distal end of said first sub-bus in a standby mode during said access cycle.

11. The data communication method of claim 10, further comprising the step of retrieving said requested data over a second one of said plurality of sub-buses from said memory device connected to said second sub-bus in response to said data request.

12. A data communication method, comprising the steps of:

receiving, in a multiprocessor system having a plurality of processors and a data bus interconnecting said plurality of processors, said data bus including a plurality of sub-buses, each of said plurality of sub-busses connecting a memory device to said plurality of processors at a distal end of said sub-bus and to every other one of said plurality of sub-buses at a proximal end of sub-bus, a request by one of said processors to access said memory device;

determining whether said sub-bus to said memory device is occupied;

when said sub-bus to said memory device is not occupied, determining whether there is a simultaneous request from a second processor; and where there is not a simultaneous request from said second processor, assigning access priority to said first processor.

13. The data communication method of claim 12, further comprising the steps of:

when said sub-bus to said memory device is occupied, sending a standby signal to said first processor;

determining whether the sub-bus to said memory device is released; and when said sub-bus to said memory device is released, executing said step of determining whether there is a simultaneous request from a second processor.

14. The data communication method of claim 12, further comprising the steps of:

when there is a simultaneous request from a second processor, determining whether said first processor has accessed said memory device since said second processor has accessed said memory device; and when said first processor has accessed said memory device since said second processor has accessed said memory device, assigning access priority to said second processor and sending a standby signal to said first processor.

15. The data communication method of claim 14, further comprising the steps of:

when said first processor has not accessed said memory device since said second processor has accessed said memory device, assigning access priority to said first processor and sending a standby signal to said second processor.

16. The data communication method of claim 12, further comprising the steps of:

sending an access accept signal to the processor assigned access priority;

determining whether the sub-bus to said memory device is released;

when said sub-bus to said memory device is released, determining whether the processor having priority is in a standby mode; and when said processor assigned priority is in a standby mode, sending an access accept signal to said processor assigned priority.

17. The data communication method of claim 16, further comprising the steps of:

determining whether the sub-bus to said memory device is released; and when the sub-bus to said memory device is released, terminating the operation.

* * * * *